(12) United States Patent
Nedderman, Jr.

(10) Patent No.: US 6,708,635 B1
(45) Date of Patent: Mar. 23, 2004

(54) SHELL JOINT WITH AN ADJUSTABLE GAS EJECTION SLOT

(75) Inventor: William H. Nedderman, Jr., Middletown, RI (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 10/267,883

(22) Filed: Oct. 8, 2002

(51) Int. Cl.[7] .................................................. B63B 1/34
(52) U.S. Cl. ...................................................... 114/67 A
(58) Field of Search .............................. 114/67 A, 67 R

(56) References Cited

U.S. PATENT DOCUMENTS 4,987,844 A * 1/1991 Nadolink .................... 114/20.1
5,603,278 A * 2/1997 Nedderman et al. ...... 114/67 R

* cited by examiner

Primary Examiner—Jesus D. Sotelo
(74) Attorney, Agent, or Firm—James M. Kasischke; Michael F. Oglo; Jean-Paul A. Nasser

(57) ABSTRACT

A water tight shell joint for a super cavitating underwater vehicle is described. The shell joint includes a female member defining a first part of at least one slot for ejecting gas, a male member defining a second part of the at least one gas ejection slot, and at least one shim for adjusting the width of the at least one slot to obtain a volume of ejected gas sufficient to obtain a uniform cavity about the vehicle.

13 Claims, 2 Drawing Sheets

SHELL JOINT WITH AN ADJUSTABLE GAS EJECTION SLOT

STATEMENT OF GOVERNMENT INTEREST

The invention described herein may be manufactured and used by and for the Government of the United States of America for governmental purposes without the payment of any royalties thereon or therefore.

BACKGROUND OF THE INVENTION (1) Field of the Invention

The present invention relates generally to an adjustable gas ejection slot and more particularly to a water tight shell joint for super cavitating underwater vehicles with an adjustable gas ejection slot.

(2) Description of the Prior Art

Systems for reducing the drag on a vehicle moving through a fluid by ejecting a fluid into a boundary layer adjacent the nose portion of a vehicle are known in the art. One such system is shown in U.S. Pat. No. 5,603,278 to Nedderman et al.

The forward shell of a super cavitating underwater vehicle requires three or more supplemental gas ejection slots in order to maintain a cavity over the entire vehicle. The gas flow needs to be metered in order to provide the correct amount of gas at the right location. The width of the slot needs it to be matched to the volume of gas being ejected in order to get a uniform cavity.

SUMMARY OF THE INVENTION

Accordingly, it is an object of the present invention to provide a shell joint for a vehicle with at least one adjustable gas ejection slot.

It is a further object of the present invention to provide a shell joint as above with at least one slot which can be adjusted to match a volume of gas which needs to be ejected in order to obtain a uniform cavity over the vehicle.

The foregoing objects are attained by the shell joint of the present invention.

In accordance with the present invention, a shell joint for use on a vehicle, particularly an underwater vehicle, is provided. The shell joint broadly comprises a female member defining a first part of at least one slot for ejecting gas, a male member defining a second part of the at least one slot, and means for adjusting the width of the at least one slot to obtain a volume of ejected gas sufficient to obtain a uniform cavity about the vehicle.

Other details of the water tight shell joint of the present invention, as well as other objects and advantages attendant thereto, are set forth in the following detailed description and the attached drawing wherein like reference numerals depict like elements.

DESCRIPTION OF THE PREFERRED EMBODIMENT(S)

The present invention relates to a water tight, annular shell joint for super cavitating water vehicles with an adjustable gas ejection slot. The forward shell of the vehicle is tapered making it more economical to machine it from short lengths of stock. A series of ejection slots are needed in this area in order to maintain a cavity over the entire vehicle. It has been found to be convenient to incorporate the ejection slots into the joint.

Figure 1:
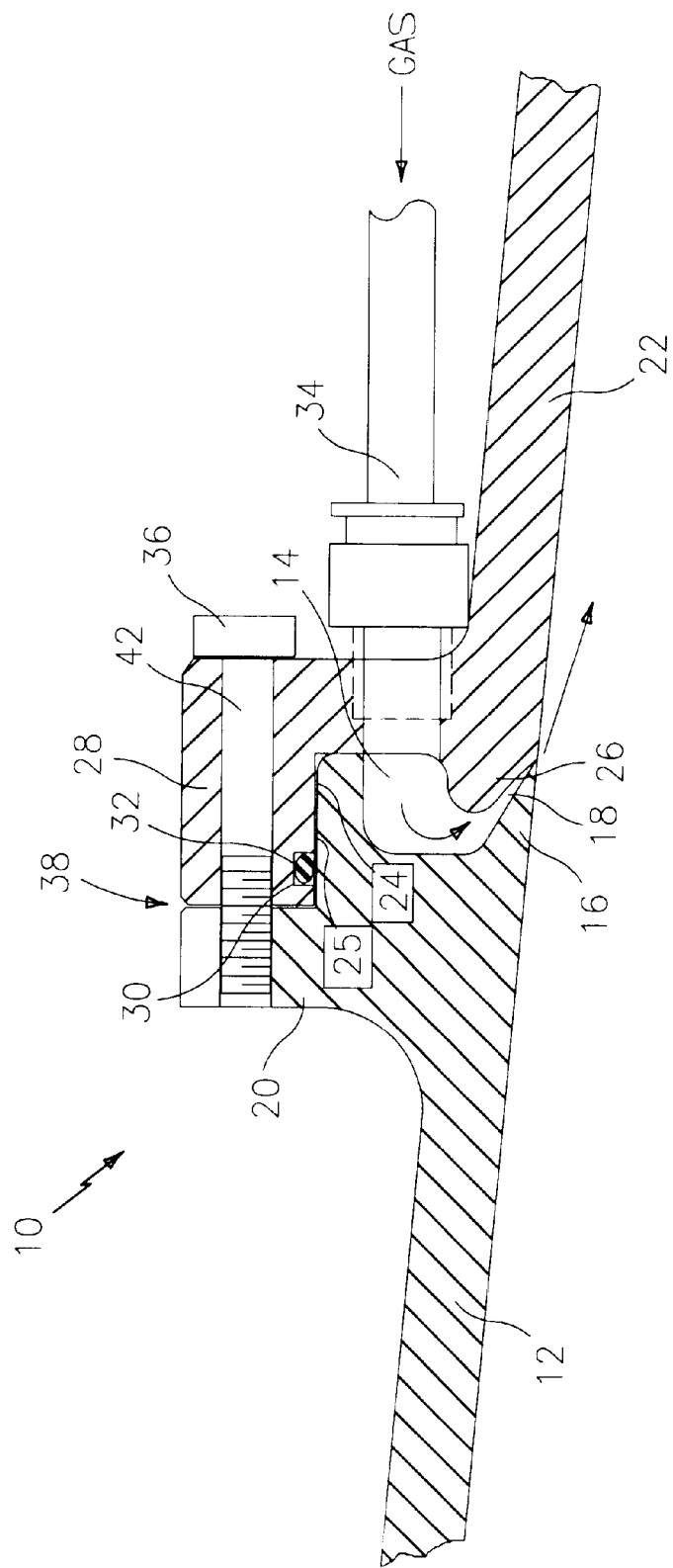
FIG. 1 illustrates a cross section of a water tight shell joint in accordance with the present invention.
Figure 2:
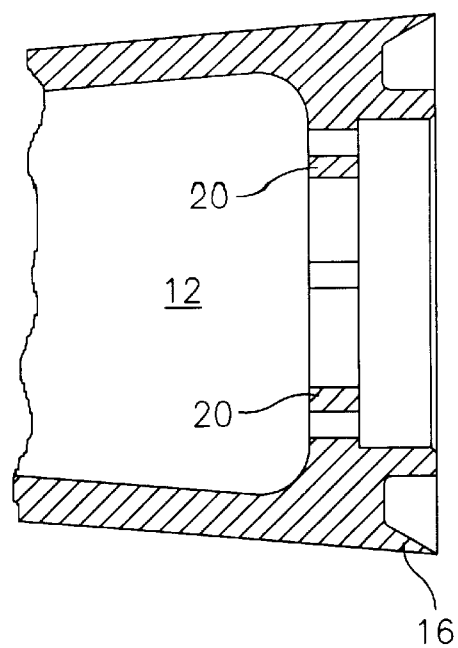
FIG. 2 illustrates a portion of the female member of the joint of FIG 1.
Figure 3:
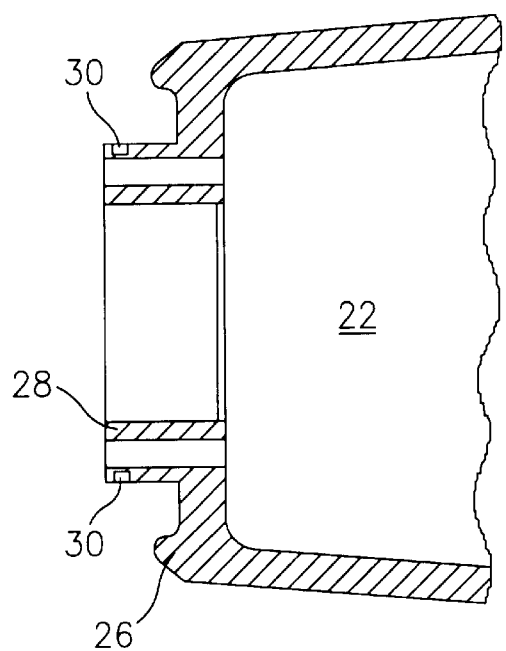
FIG. 3 illustrates a portion of the male member of the joint of FIG. 1.

Referring now to FIGS. 1–3, a cross section of a portion of a water tight, annular shell joint 10 in accordance with the present invention is shown. As can be seen from FIGS. 2 and 3, the female member 12 and the male member 22 of the joint 10 are actually formed by cylindrical bodies.

As can be seen from FIG. 1, the female member 12 of the joint 10 contains part of a gas ejection annulus 14. The female member 12 also includes an aft facing deflector 16 that forms a first part of a tapered slot 18 for aiming escaping gas back along the shell. A bolt flange 20 with threaded holes is provided as part of a means for securing the female member 12 to the male member 22. An aft projection 24 on the female member 12 forms an O-ring sealing surface 25.

The male member 22 of the joint 10 has the other part of the annulus 14 and a first forward facing protrusion 26 that forms the other part of the tapered slot 18. The male member 22 also has a second forward facing protrusion 28 which serves as a bolt flange. As can be seen from FIG. 1, the protrusion 28 overlaps a portion of the sealing surface 25 and contains a groove 30 for housing an O-ring 32 to seal the joint 10 so as to make it water tight.

A gas line 34 supplies gas to the annulus 14 where it escapes through slot 18. A typical joint 10 may have two or more gas lines depending on the diameter of the annulus 14.

A plurality of fasteners 36, such as bolts, are provided to join the female and male members 12 and 22 together. The number of fasteners 36 used to secure the members 12 and 22 together depends on the diameter of the joint 10.

FIG. 1 shows the slot 18 with a minimal opening. The width of the slot 18 may be increased by inserting shims 38 into the space 40 between the flanges 20 and 28. The shims 38 may be in the form of washers held in place by the shanks 42 of the fasteners 36. Alternatively, the shims 38 may be large shim flanges having the same bolt pattern as the flanges 20 and 28.

The joint 10 of the present invention solves several problems in building a tapered forward shell for a super cavitating vehicle. The forward shell can be made in short sections of different diameters of stock so less stock is used. Having the slots at the joint makes the rather complex slots and annulus easier to machine. Shimming the bolt flanges allows the slot width to be very precisely adjusted.

It is apparent that there has been provided in accordance with the present invention a shell joint with an adjustable gas ejection slot which fully satisfies the objects, means, and advantages set forth hereinbefore. While the present invention has been described in the context of specific embodiments thereof, other alternatives, modifications, and variations will become apparent to those skilled in the art having read the foregoing description. Accordingly, it is intended to embrace those alternatives, modifications, and variations as fall within the broad scope of the appended claims.

What is claimed is:

1. A shell joint for use on a vehicle comprising:
   a female member defining a first part of at least one slot for ejecting gas and a first part of a gas ejection annulus communicating with said at least one slot;
   a male member defining a second part of said at least one gas ejection slot and a second part of said gas ejection annulus; and means for adjusting the spacing between said female member and said male member to obtain a volume of ejected gas sufficient to obtain a uniform cavity about the vehicle.

2. A shell joint according to claim 1 further comprising:

said female member having a first flange;

said male member having a second flange; and said adjusting means comprising at least one shim to be inserted into a space between said first and second flanges.

3. A shell joint according to claim 2 further comprising:

at least one fastener for securing said male member to said female member, said at least one fastener passing through an opening in said second flange and being received in said first flange;

said at least one fastener having a shank; and said at least one shim comprises at least one washer held in place by the shank of said at least one fastener.

4. A shell joint according to claim 2 wherein each of said flanges has a bolt pattern and said at least one shim comprises at least one shim flange having a bolt pattern identical to the bolt pattern of each of said flanges.

5. A shell joint according to claim 1 further comprising at least one gas line communicating with said gas ejection annulus.

6. A shell joint according to claim 1 wherein:

said female member has an aft projection forming a sealing surface;

said male member has a forward facing protrusion which overlaps a portion of said sealing surface, said forward facing protrusion having a groove formed thereon; and further comprising a sealing means positioned within said groove for forming a water tight joint between said male and female members.

7. A shell joint according to claim 6 wherein said sealing means comprises an O-ring.

8. A shell joint according to claim 1 wherein:

said female member has an aft facing deflector to form said first part of said slot; and said male member has a forward facing protrusion to form said second part of said slot.

9. A shell joint for use on a vehicle comprising:

a female member having a first flange and defining a first part of at least one slot for ejecting gas;

a male member having a second flange and defining a second part of said at least one gas ejection slot; and at least one shim positioned between said female member first flange and said male member second flange to obtain a volume of ejected gas sufficient to obtain a uniform cavity about the vehicle;

a gas ejection annulus communicating with said at least one slot; and at least one gas line communicating with said gas ejection annulus.

10. A shell joint according to claim 9 further comprising:

at least one fastener having a shank for securing said male member to said female member, said at least one fastener passing through an opening in said second flange and being received in said first flange; and said at least one shim comprises at least one washer held in place by the shank of said at least one fastener.

11. A shell joint according to claim 9 wherein each of said flanges has a bolt pattern and said at least one shim comprises at least one shim flange having a bolt pattern identical to the bolt pattern of each of said flanges.

12. A shell joint according to claim 9 wherein:

said female member has an aft projection forming a sealing surface;

said male member has a forward facing protrusion which overlaps a portion of said sealing surface, said forward facing protrusion having a groove formed thereon; and further comprising a sealing means positioned within said groove for forming a water tight joint between said male and female members.

13. A shell joint according to claim 12 wherein said sealing means comprises an O-ring.

* * * * *